US008605982B2

(12) United States Patent　　(10) Patent No.:　　US 8,605,982 B2
Jackson et al.　　(45) Date of Patent:　　Dec. 10, 2013

(54) CHECK BOUNDARY DETECTION BY STRING LITERAL ANALYSIS

(75) Inventors: Charles W. Jackson, Tampa, FL (US); Steven Mandel, Tampa, FL (US); Robert Scott Moriarty, Tampa, FL (US)

(73) Assignee: Hyland Software, Inc., Westlake, OH (US)

( * ) Notice: Subject to any disclaimer, the term of this patent is extended or adjusted under 35 U.S.C. 154(b) by 96 days.

(21) Appl. No.: 13/422,463

(22) Filed: Mar. 16, 2012

(65) Prior Publication Data

US 2012/0170829 A1　　Jul. 5, 2012

Related U.S. Application Data

(63) Continuation-in-part of application No. 12/538,552, filed on Aug. 10, 2009, now Pat. No. 8,155,425.

(60) Provisional application No. 61/087,811, filed on Aug. 11, 2008.

(51) Int. Cl.
　　*G06K 9/00*　　(2006.01)
(52) U.S. Cl.
　　USPC ............................ 382/140; 382/199; 705/45

(58) Field of Classification Search
　　USPC ..................... 382/100, 137–140, 199; 705/45
　　See application file for complete search history.

(56) References Cited

U.S. PATENT DOCUMENTS

| 3,000,000 | A | | 9/1961 | Eldredge |
| 4,949,392 | A | | 8/1990 | Barski et al. |
| 5,062,141 | A | * | 10/1991 | Nakayama et al. ........... 382/174 |
| 5,119,433 | A | | 6/1992 | Will |
| 6,654,487 | B1 | | 11/2003 | Downs, Jr. |
| 7,315,389 | B2 | * | 1/2008 | Kuwata et al. ............... 358/1.15 |
| 7,415,130 | B1 | * | 8/2008 | Rundle et al. ................. 382/101 |
| 7,996,227 | B2 | * | 8/2011 | Boyle et al. ................... 704/270 |
| 8,132,151 | B2 | * | 3/2012 | Ahern et al. .................. 717/115 |

* cited by examiner

*Primary Examiner* — Shefali Goradia
(74) *Attorney, Agent, or Firm* — Anton J. Hopen; Smith & Hopen, P.A.

(57) ABSTRACT

A method of locating a check image region within a document image comprising the steps of locating a magnetic ink character recognition region of the check and calculating the top of the check relative to the magnetic ink character recognition region by detection of string literals having a historical and/or contextual relationship to the upper check boundary.

18 Claims, 11 Drawing Sheets

CHECK BOUNDARY DETECTION BY STRING LITERAL ANALYSIS

PRIORITY CLAIM

This application claims benefit of U.S. Provisional Application Ser. No. 61/087,811 filed Aug. 11, 2008 entitled "Automated Check Detection and Imaging Cropping" and U.S. Non-Provisional application Ser. No. 12/538,552 filed Aug. 10, 2009 entitled "Automated Check Detection and Image Cropping."

FIELD OF INVENTION

This invention relates to document image processing, and specifically, to automatically detecting and cropping a bank check region of an image.

BACKGROUND OF THE INVENTION

Existing check reader recognition technologies assume that the image being processed is only the image of the check with no extraneous information. These technologies typically work with specialized check scanners and rely heavily upon a mailroom preparation process where the check portion of the paper is removed form the rest of the paper document. Companies that wish to scan the entire paper document, keeping it intact are currently unable to use these recognition technologies.

A technology is needed to automatically locate the check image within the entire paper document and use the resulting check image or its coordinates with existing check reader recognition technologies. This will enable companies to keep their paper documents intact, therefore bypassing the mailroom preparation process.

SUMMARY OF INVENTION

This invention automatically locates the check image within the entire paper document image. The check is located in a two step process. First the bottom of the check (MICR region) is identified. Magnetic Ink Character Recognition (MICR) is a character recognition technology utilized primarily by the banking industry to facilitate the processing of checks. The process was shown to the American Bankers Association in 1956, and employed in the U.S. by 1963 almost universally. On Sep. 12, 1961, Stanford Research Institute (now SRI International) was awarded U.S. Pat. No. 3,000,000 for the invention of MICR, the disclosure of which is incorporated herein by reference.

Relative to lower MICR area, the top of the check is then located. Optionally, the resulting area can be used to write out a new image that will contain only the check portion of the document. The resulting check image can subsequently be used with existing check reader recognition technologies keeping the original paper document intact. Alternatively, the coordinates of the check area can be communicated to the check recognition engine.

An embodiment of the invention includes a method of resolving a check image region within a document image comprising the steps of processing by optical character recognition (OCR) a full page document image containing rows of text. The OCR is applied using a MICR-specific font so that non-MICR fonts return a higher level of OCR exceptions than MICR fonts in the document image. The level of OCR exceptions for each row of text in the document image is calculated using the presumption that alternate fonts such as Arial or Times New Roman will generate more OCR exceptions since the OCR process is specifically looking for MICR font characters.

The location of the row of text most likely to contain the MICR data is resolved based on the level of OCR exceptions. The lower boundary of the check image region is defined by the location of the MICR data.

The next step is that of establishing a check top candidate area. The check top candidate area is defined by a collection of variations in height of predefined check dimensions measured from the location of the MICR data. Standard checks typically vary in height between 2.5 and 3.5 inches. A horizontal raster line is detected within the check top candidate area whereby the horizontal raster line defines the top of the check. Line detection by OCR processing is well known as described in U.S. Pat. No. 4,949,392, the specification of which is incorporated herein by reference. An upper boundary of the check image region is thus defined by the location of the horizontal line. Finally, the full page document image is digitally cropped above the upper boundary and below the lower boundary to transform the full page document image to a check-specific image. This check-specific image may be saved to a new image file.

There may be instances wherein a plurality of horizontal lines exists within the check top candidate area. In such instances, the upper boundary of the check image region is defined by the location of the horizontal raster line that is closest to a standard check size. In a condition of uncertainty, the line farthest from the lower boundary is selected. This approach may occasionally lead to a larger cropped image but it forgoes the danger of too aggressively cropping out substantive information on the check.

There may also be instances wherein an absence of detectable horizontal raster lines exists. In those instances, the tallest check height dimension is selected from the collection to define the upper boundary.

An embodiment of the invention is also disclosed in the form of a computer-readable media having computer-executable instructions for performing a method of running a software program on a computer. An example of such software includes that sold under the brand INIFIWORX manufactured by AnyDoc Software based in Tampa, Fla. This embodiment includes one or more computer-readable media having computer-executable instructions for performing a method of running a software program on a computer, the computer operating under an operating system, the method including issuing instructions from the software program comprising the steps of processing by OCR a full page document image containing rows of text using a MICR-specific font wherein non-MICR fonts return a higher level of OCR exceptions than MICR fonts in the document image, calculating the level of OCR exceptions for each row of text in the document image, resolving the location of the row of text most likely to contain the MICR data based on the level of OCR exceptions, defining a lower boundary of the check image region by the location of the MICR data, establishing a check top candidate area, the check top candidate area defined by a collection of variations in height of predefined check dimensions measured from the location of the MICR data, detecting a horizontal raster line within the check top candidate area whereby the horizontal raster line defines the top of the check, defining an upper boundary of the check image region by the location of the horizontal line and digitally cropping the full page document image above the upper boundary and cropping the full page document image below the lower boundary to transform the full page document image to a check-specific image.

It should be understood that this invention may be deployed on a wide variety of operating systems and computer platforms ranging from personal computers to mainframe systems. Within the field of document management, it is well known to batch process a large number of images at a time under an automated framework. Full page document images may be scanned prior to implementing this process or may have been computer-generated and never existed as hardcopy.

An advantage of the current invention is that MICR data is near-universal for modern checks and therefore originating check locations with a universal constant provides, in turn, a universal solution for check detection that accommodates a wide variety of check format diversity.

Another advantage of the current invention is that variable check heights may be accommodating by detecting a horizontal raster line associated with the top of the check. This permits more precise check cropping thus improve framing and accentuate subject matter for subsequent analysis, transmission and/or archiving.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The fundamental process of the present invention may be encompassed in two steps. The first step in locating the check image involves finding the bottom of the check. For this to be done accurately, the MICR line must be located. To accomplish this, full page OCR is performed on the image using a MICR only font. MICR has been almost universally adopted by the banking industry to facilitate the processing of checks. Almost all checks in the United States and United Kingdom include MICR characters at the bottom of the paper in a font known as E-13B.

Most of the OCR data returned is erroneous since the image mostly contains non-MICR information. The resulting OCR results are then analyzed to determine which row of text contains the actual MICR data. A voting algorithm is used that weights the ASCII data row with the most characters and the highest confidence values as returned by the OCR engine.

The second step of the process involves locating the top of the check. This is accomplished by using technology that locates horizontal raster lines of the image. As with most check documents, many horizontal lines may be discovered. Since check sizes are standardized (between 2.5 and 3.5 inches) the line that relates closest to these standard sizes is chosen with a bias towards the larger check. In such instances, the upper boundary of the check image region is defined by the location of the horizontal raster line that is closest to a standard check size. In a condition of uncertainty, the line farthest from the lower boundary is selected. The reasoning behind this is to preserve the check image in case the wrong line is chosen. In the case where no lines are located, the invention defaults to the larger check size.

Figure 1:
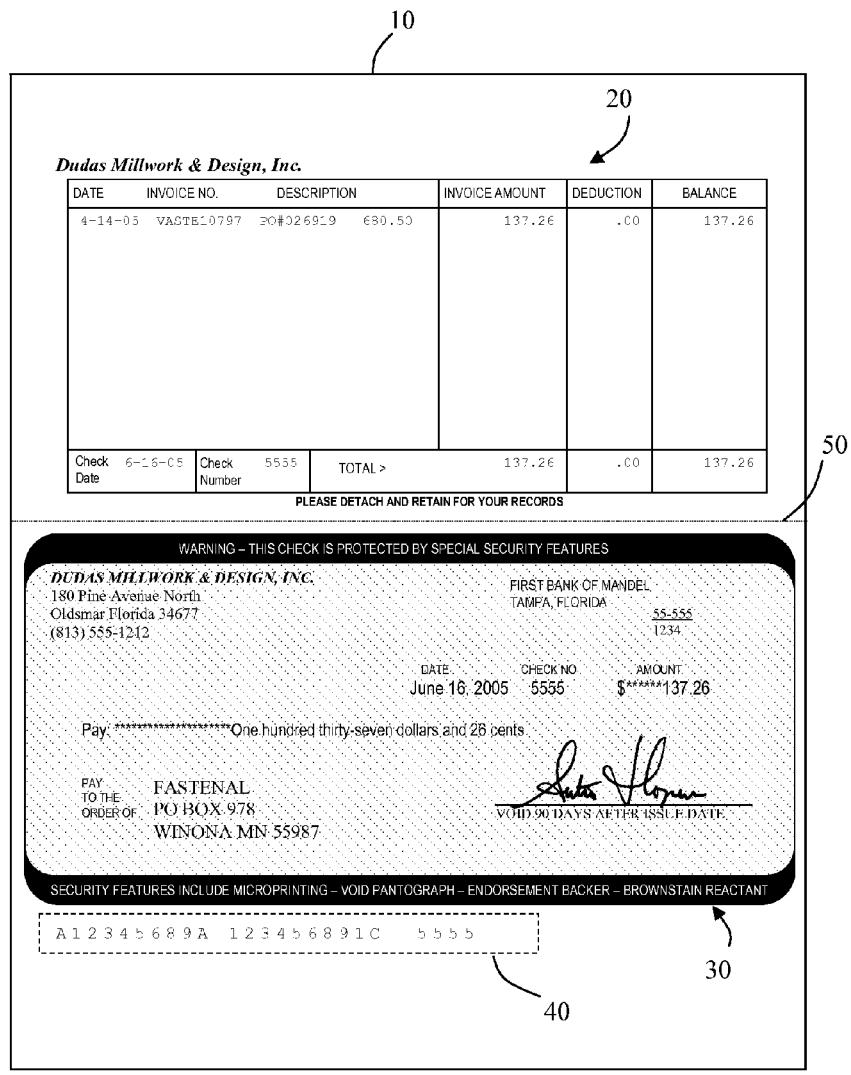
FIG. 1 shows a payment stub and check separated by a perforated tear line.

Turning to FIG. 1, full page document image 10 is either generated electronically or scanned from a hardcopy using an optical scanner. Document image 10 includes check stub 20, check section 30 having a MICR region 40, and perforation 50 to detach check section 30 from check stub 20. In one application of the present invention, thousands of remittance checks such as those paid by distributors to a manufacturer are received and scanned in as a batch process. However, each distributor may use a different check style, font and/or layout. The manufacturer wants to store images of only the check and not the check stub or ancillary data. Additionally, the manufacturer may want to run OCR on the check only in a downstream process to monitor remittances for its billing system. For all these reasons and more, it is desirable to improve framing, accentuate subject matter and/or change aspect ratio of full page document image 10.

Figure 2:
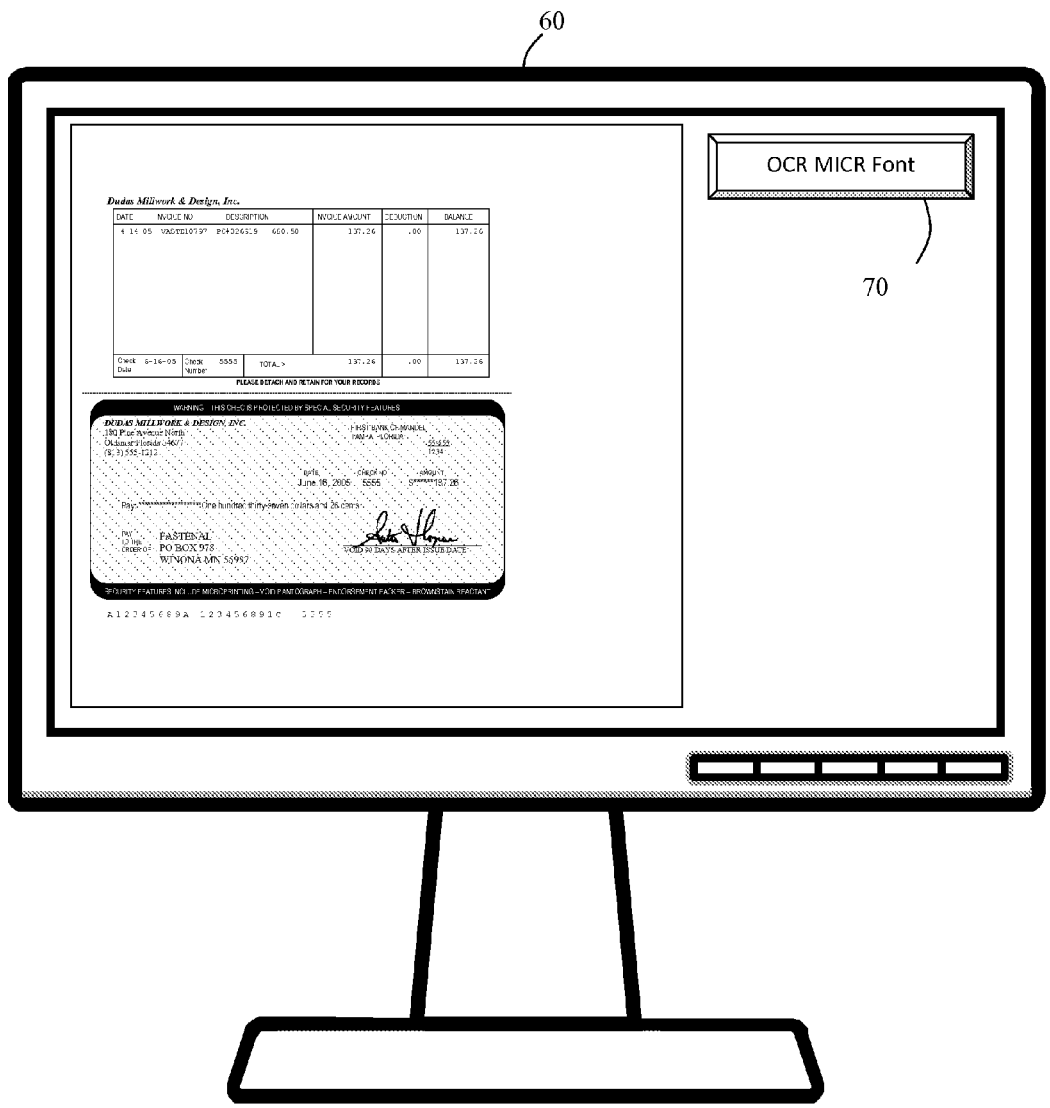
FIG. 2 shows a computer screen display of a digitally imaged check and payment stub.
Figure 3:
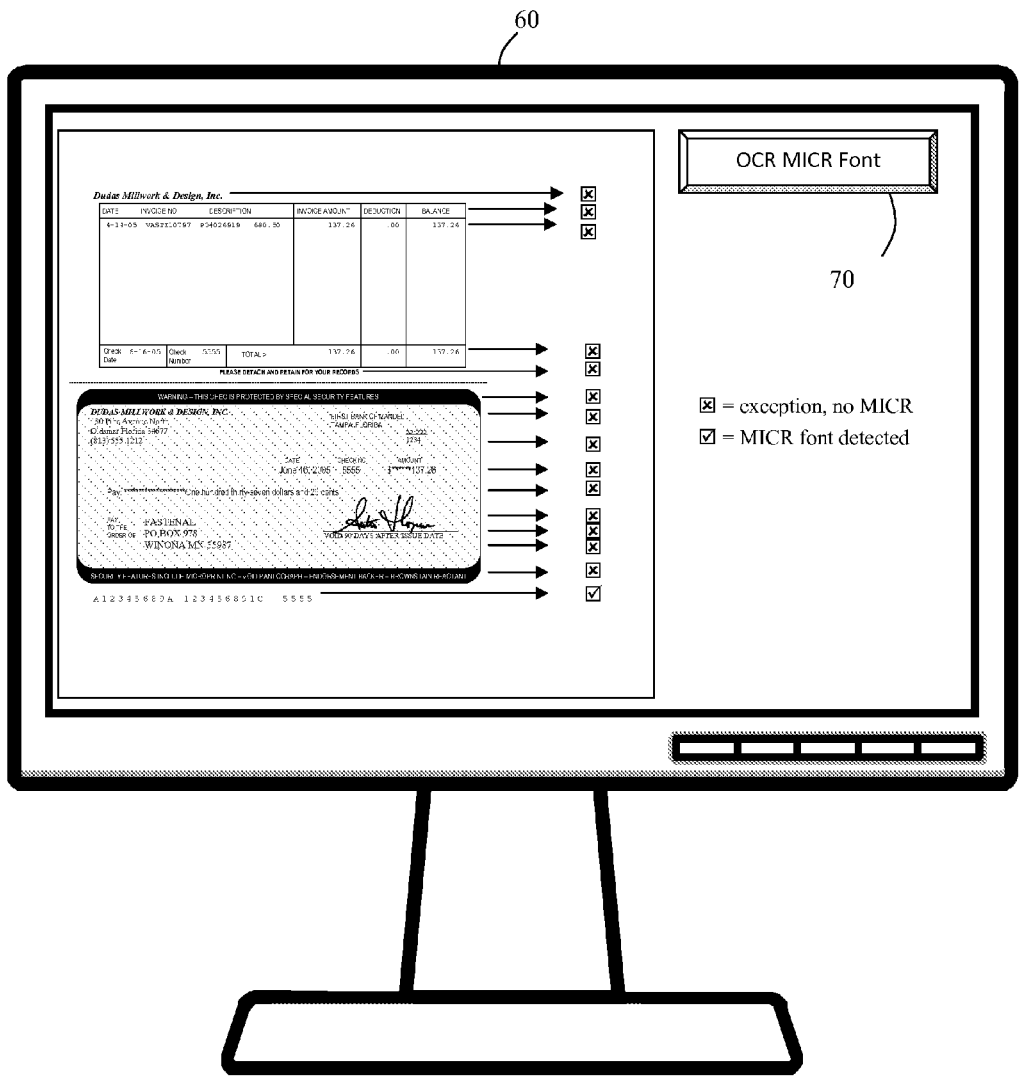
FIG. 3 shows a computer screen display of a MICR font-specific OCR process applied to the digitally imaged check and payment stub.

In FIG. 2, computer display 60 shows a visual representation of document image 10 for illustrative purposes only. OCR execution button 70 is shown, again, for demonstrative purposes as a commercial embodiment of the present invention would include the option to automate the batch processing of a plurality of document images without requiring user interaction. In FIG. 3, each row of text in document image 10 is processed by OCR for a MICR font. As shown for illustrative purposes, fourteen (14) rows generated exceptions denoted with an "x." while the last row detected a valid MICR font denoted with a check box. The Cartesian coordinates of the last row defines the lower boundary of the check. The next step is to determine the upper boundary of the check.

Figure 4:
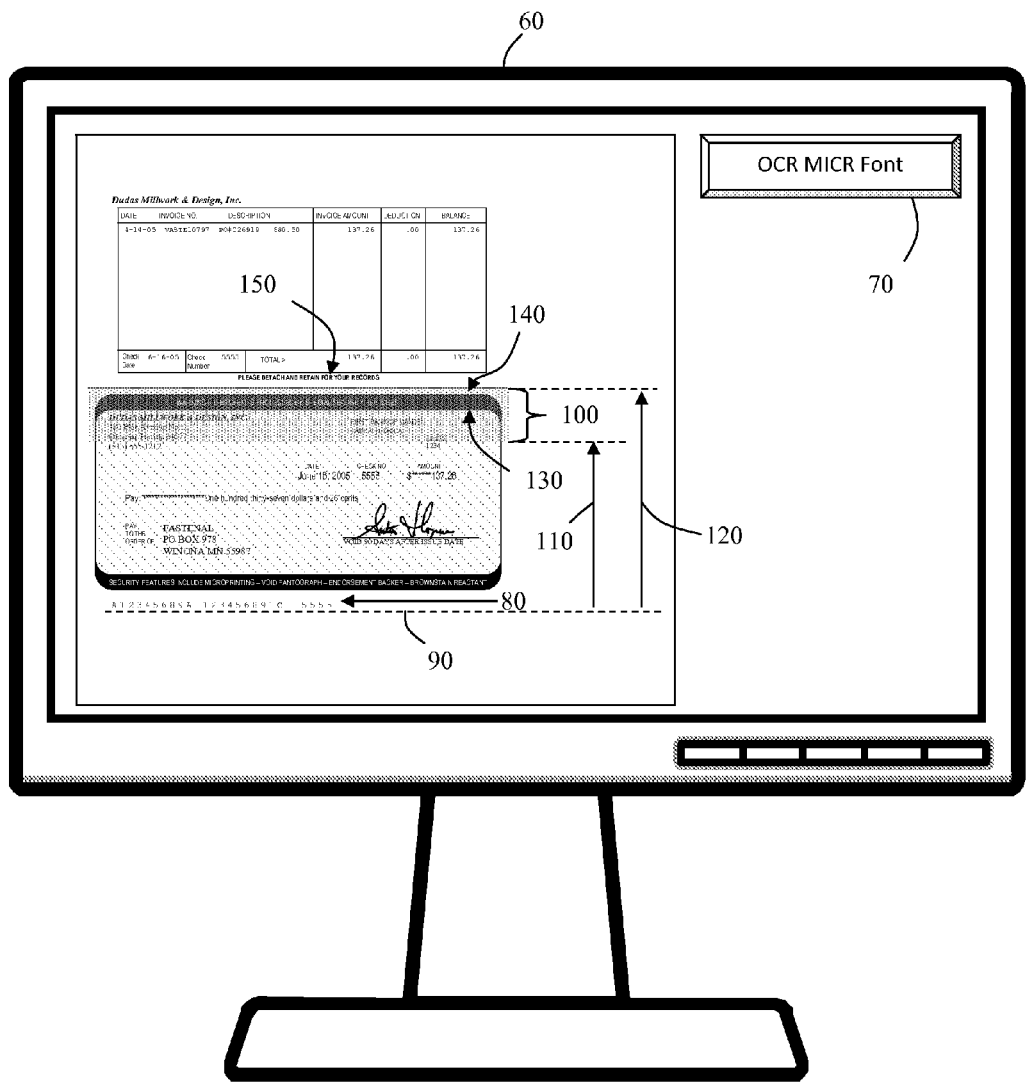
FIG. 4 shows a computer screen display illustrating an embodiment of the invention to determine the location of the top of the check relative to the MICR region.

In FIG. 4, MICR text 80 defines lower boundary 90 of the check image. Check top candidate area 100 is defined by a collection of variations in height of a predefined check dimensions measured from lower boundary 90. Small check size height 110 establishes the lower edge of check top candidate area 100. Large check size height 120 establishes the upper edge of check top candidate area 100. Within check top candidate area 100 exists first horizontal line 130 and second horizontal line 140. Third horizontal line 150 constitutes the lower portion of the check stub but would be ineligible to define the upper boundary of the check as it is located outside of check top candidate area 100.

In an embodiment of the invention, the horizontal line most distant from lower boundary 90 and existing within check top candidate area 100 defines an upper boundary of the check image region. This helps mitigate the possibility that the check image would be too tightly cropped and thus exclude information later required. In this example, second horizontal line 140 would define the upper boundary of the check image region. In the event that no horizontal line was detected, the upper edge of check top candidate area 100 calculated from large check size height 120 becomes the default upper boundary of the check image region. Horizontal lines are detected by pel pattern techniques as known in the art.

Figure 5:
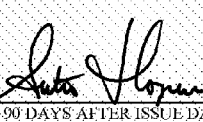
FIG. 5 shows a computer screen display illustrating an embodiment of the invention whereby non-check areas of the digital document image are cropped out.
Figure 6:
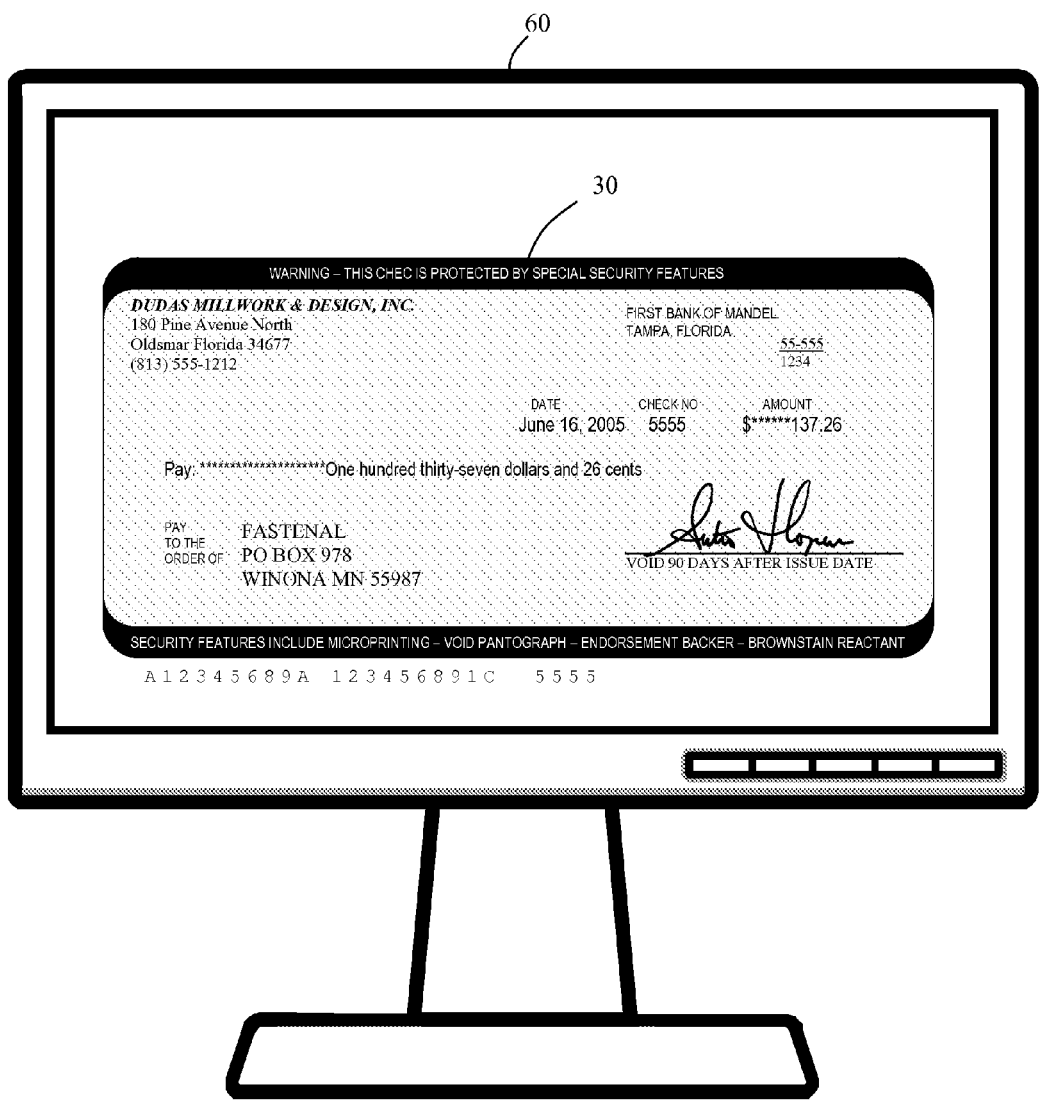
FIG. 6 shows a computer screen display illustrating an embodiment of the invention showing the extracted check image as a separate, new image file.

FIG. 5 shows check section 30 extracted from the cropped area above and below check section 30. FIG. 6 shows computer display 60 displaying check section 30 as a separate image file.

Figure 7:
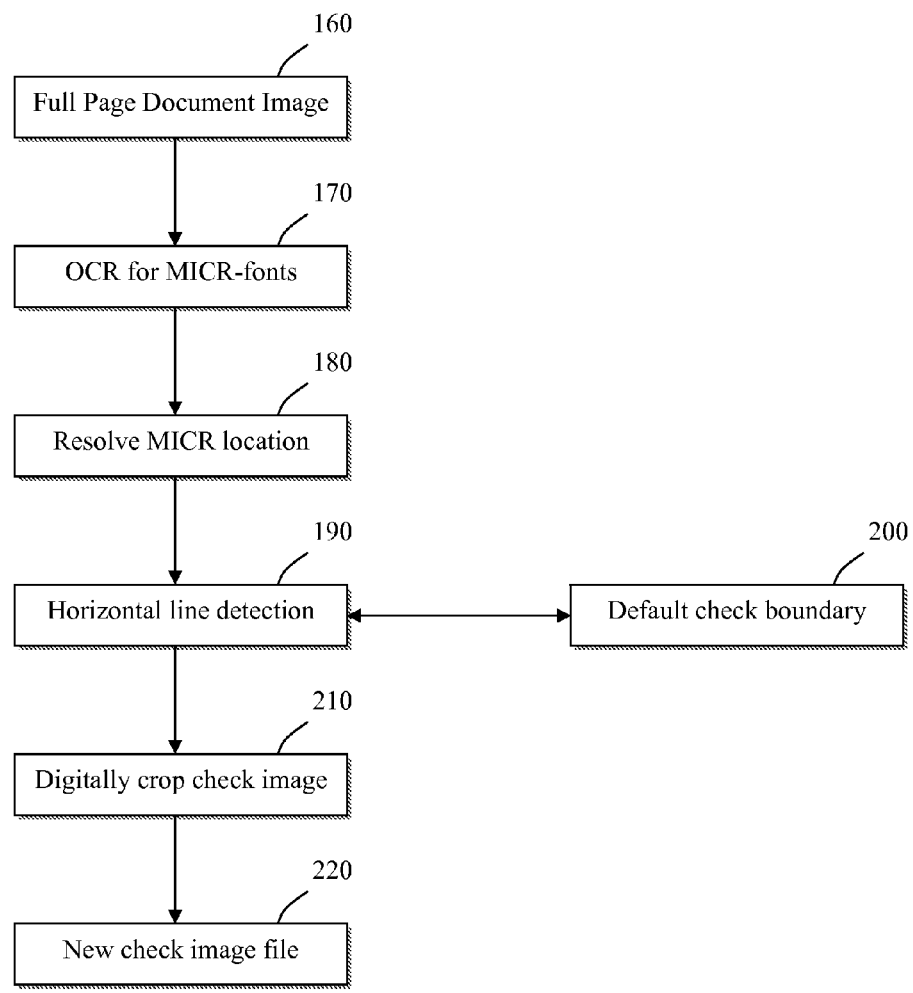
FIG. 7 is a diagrammatic illustration of an embodiment of the invention that finds the upper check boundary by horizontal line detection.

FIG. 7 shows the steps to an embodiment of the invention including retrieving a full page document image 160 having a check image continued therein. The document image is OCR processed 170 for MICR fonts. Non-MICR fonts generate exceptions as they are not well-resolved by the OCR settings. MICR fonts, by contrast, are more easily identified to resolve MICR location 180. Thus, the lower boundary of the check image region is defined by the location of the MICR data. Horizontal line detection 190 is applied to an area above the lower boundary, the area defined by the various possible check heights expected. Horizontal lines within that candidate area are used to resolve the upper boundary of the check image region. When a plurality of horizontal lines are encountered, the line most distant from the lower boundary is selected. When no horizontal lines are detected, the largest anticipated check size is used to define the upper boundary. The check image is digitally cropped 210 from the rest of the document image and a new check image file 220 is generated for transmittal, analysis and/or archiving.

Figure 8:
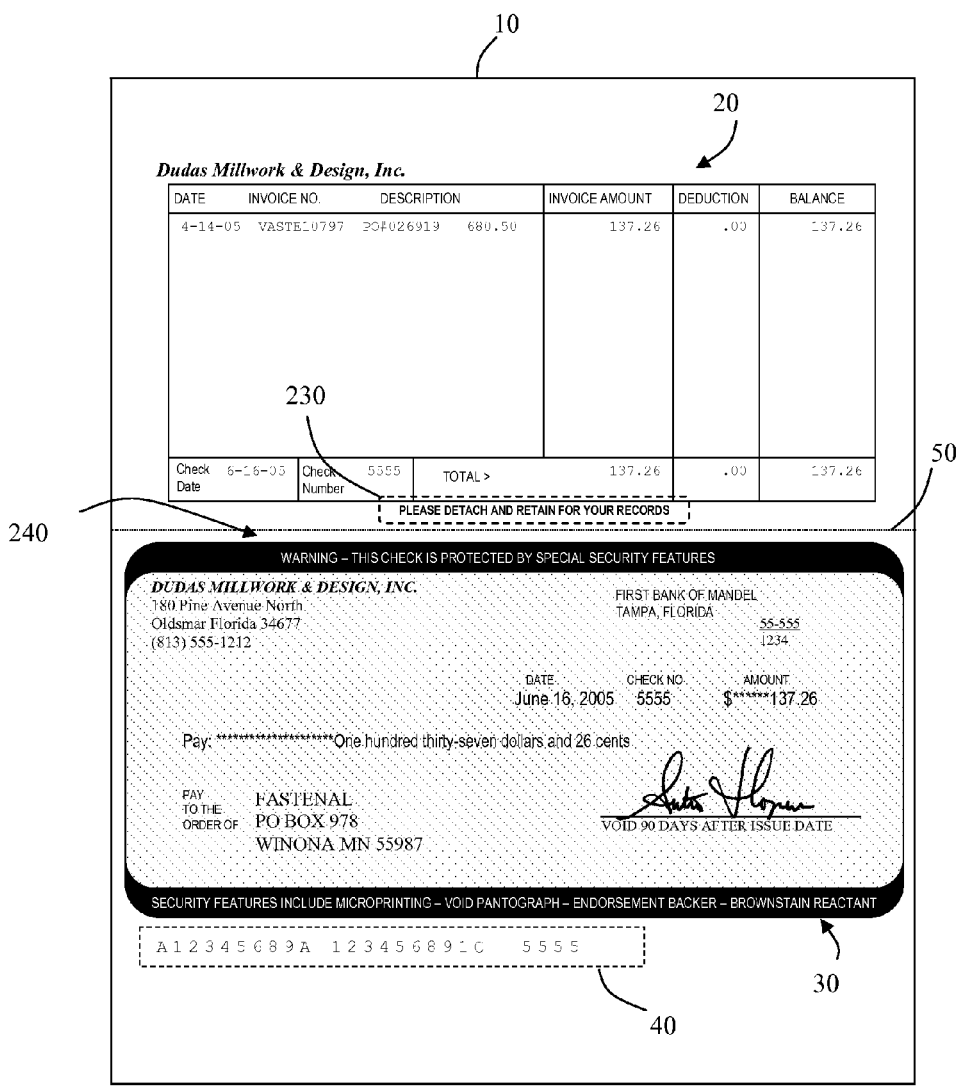
FIG. 8 shows a computer screen display illustrating an embodiment of the invention whereby string literals define the upper check boundary.

FIG. 8 shows an alternative embodiment of the invention wherein upper string literal 230 and lower string literal 240 vertically straddle perforation 50 which is the upper check boundary. Upper string literal 230 reads "PLEASE DETACH AND RETAIN FOR YOUR RECORDS" and lower string literal 240 reads "WARNING—THIS CHECK IS PROTECTED BY SPECIAL SECURITY FEATURES." Both literal character strings are contextually ambiguous as to whether the check is above or below. However, upper string literal 230 contextually is significant that it is likely perforation 50 is close by. Accordingly, upper string literal 230 may be used to designate a check top candidate area from which horizontal raster lines are detected and attributed to the upper boundary of the check for cropping purposes.

Figure 9:
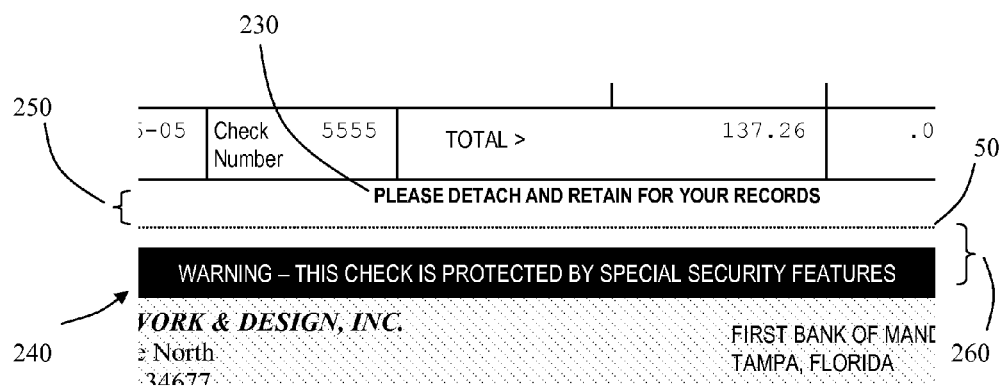
FIG. 9 shows a computer screen display illustrating an embodiment of the invention whereby distances above and below string literals are used to resolve the upper check boundary.
Figure 10:
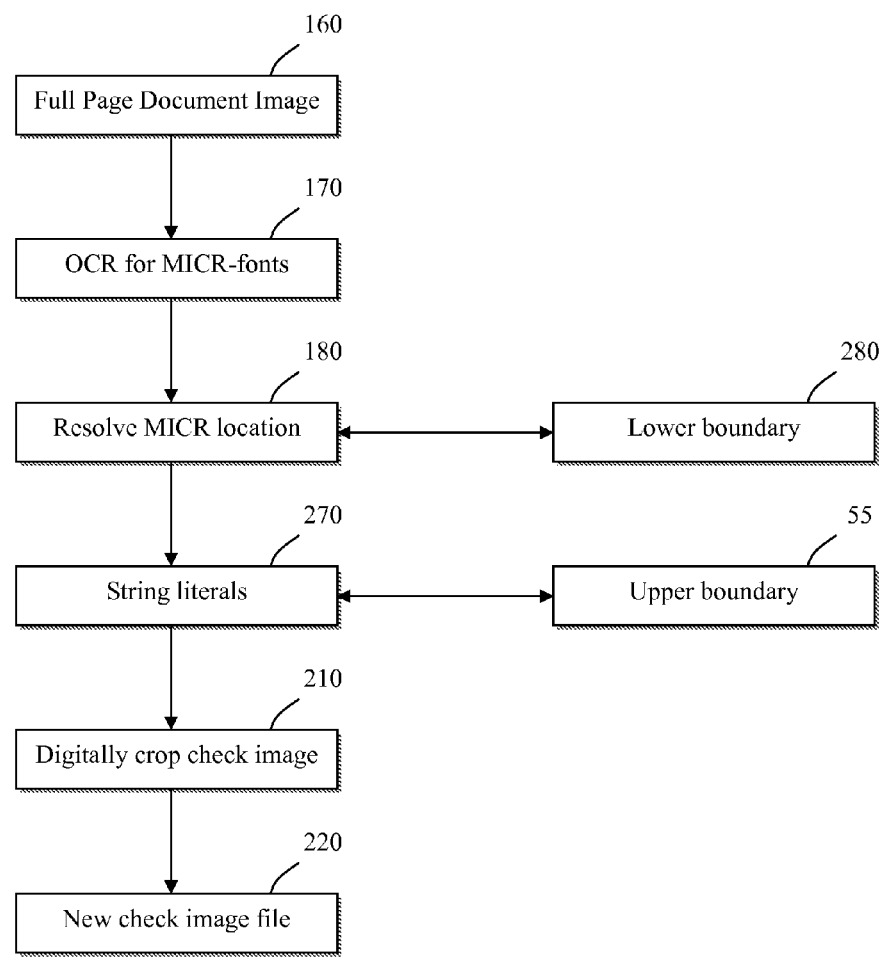
FIG. 10 is a diagrammatic illustration of an embodiment of the invention that locates the upper check boundary by detection of string literals.
Figure 11:
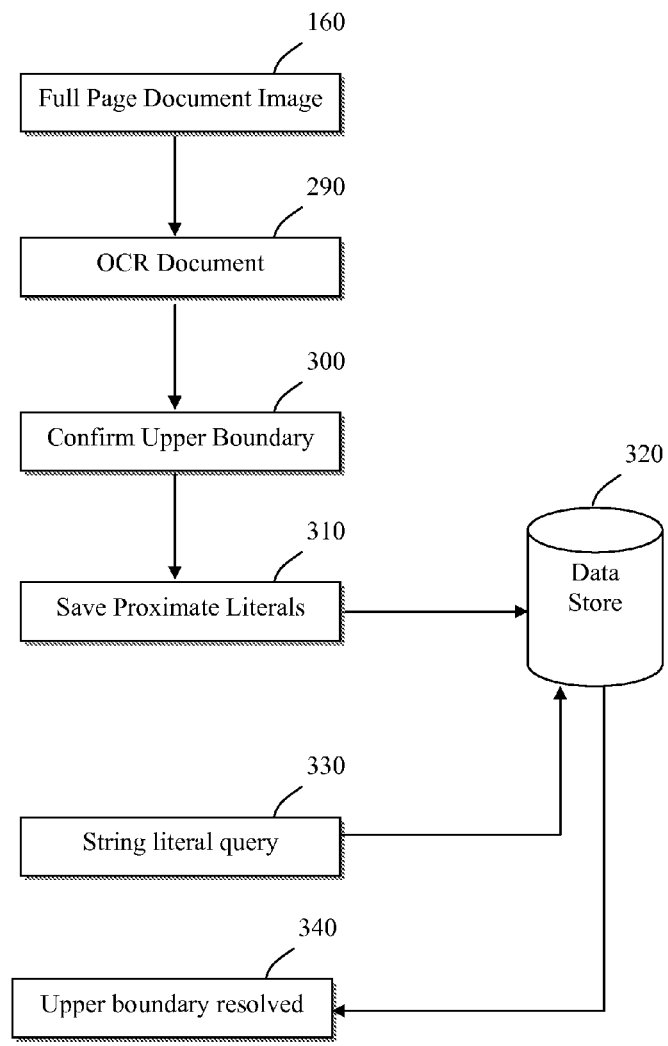
FIG. 11 is a diagrammatic illustration of an embodiment of the invention showing the storage and retrieval of string literals.

In FIG. 9, the upper string literal 230 is positioned above distance 250 from perforation 50 (or horizontal raster line) while lower string literal 240 is positioned below distance 260 perforation 50. Distances 250 and 260 may be saved to a data store 320 (FIG. 11) along with the alphanumeric characters of the string literals for regressive analysis. In FIG. 10, the lower boundary 280 of the check is established from the MICR location 180. Detected string literals 270 define the upper boundary 55 of the check. In FIG. 11, the full page document image 160 is subject to OCR processing 290 and the upper boundary of the check image is confirmed 300 by manual or automated exception validation techniques. String literals returned from an OCR engine near the confirmed upper boundary 300 are saved 310 into data store 320. Subsequent check processing queries 330 data store 320 to cross reference string literals found in the current check processing to see if they have historically or contextually been found to designate a check top candidate area and/or an upper boundary of the check. If a query match if found than the upper boundary is resolved 340. Alternatively, a check top candidate area may be found from which a horizontal raster line may be sought to establish the upper boundary.

GLOSSARY OF CLAIM TERMS

Check Image Region: the portion of a check containing data pertinent to the financial transaction instrument apart from the check stubs and other collateral data, particularly for checks printed on full pages (e.g., letter-size or A4-size) which are commonly perforated to detach the check itself.

Check Specific Image: a bitmapped image substantially consisting of only the financial instrument itself (i.e., the check).

Confidence Threshold: is a value for the reliability of a string literal designating the location of a check's upper boundary or at least designating the approximate area of the upper boundary. This confidence threshold may be based on the context of the string literal itself For example, a string literal that contains the characters "please detach above and retain for your records" would have a relatively high level of confidence that the check stub is above the string literal and the check itself is below the string literal. The confidence threshold may also be assignable in conjunction with additional variable including the MICR account number or other text data returned from an OCR engine such as the payer or payee. The confidence threshold may be set by an end-user operator of the software or may be calculated based on aggregated data from a plurality of checks that have already been processed (i.e., resolved patterns).

Cropping: refers to removing portions of a check image so that is focuses attention on the financial transaction itself Digital cropping means modifying and saving the digital image as opposed to physically reducing the outer boundaries of a hardcopy (i.e., with scissors).

Data Store: is a non-transitory repository of information. This is typically a relational database which stores fields within tables. For example, a string literal may be stored in a field within a table entitled "Literals." However, the Literals table may also store additional fields related to that literal including the distance of the string literal from the top of the page, the distance of the string literal from the bottom of the page, the distance of the string literal from the MICR line, the actual MICR account number, a nearby horizontal raster line, and/or data returned from an OCR engine including, but not limited to payer and payee character strings.

Document Image: the entire scanned image, typically of voucher, standard or wallet formats. This may contain the images of one or more checks printed on a single sheet of paper. The document image may be saved in a number of bitmap image formats including, but not limited to, TIFF, PDF, JPG, GIF, or the like.

Lower Boundary: the bottom of the check image.

Magnetic Ink Character Recognition: (or MICR) works similarly to OCR but is utilized primarily by the banking industry to facilitate the processing of checks.

Optical Character Recognition: (or OCR) converts bitmap images of characters to the alphanumeric equivalent by various algorithms.

Raster Line: is a line of pixels in a digital image. This may denote a perforation in the hardcopy page containing the check and the check stub. Alternatively, it may denote the signature line, payment line or any other line of pixels in the check. Accordingly, it is helpful to identify a check top candidate area to narrow down where the top check boundary is in view of the other possible raster lines in a full page image.

Regressive Analysis: a model of the relationship between the expected location of an otherwise unknown upper boundary for a check with string literals historically present above or below the upper boundary.

String Literal: an array of alphanumeric characters resolved by OCR processing a bitmap containing a check image. Typically, the characters would correspond to the ASCII text standard. String literals may be identified by one-to-one comparison or may also be detected as a substring within a larger text string. For example, "detach and retain" would be a substring of "Please detach and retain for your records."

Upper Boundary: the top of the check image.

Validated Boundaries: are upper and lower check boundaries that are confirmed either by manual visual inspection of an end user or alternatively boundaries that have been passed automated exception handling analysis.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of resolving a check image region within a document image comprising the steps of:
    processing by optical character recognition a full page document image containing rows of text;
    defining a lower boundary of the check image region by the location of the magnetic ink character recognition data;
    establishing an upper boundary of the check image region, the upper boundary defined by a collection of string literals derived from a regressive analysis of string literals spatially associated with a plurality of previously validated upper boundaries; and
    digitally cropping the full page document image above the upper boundary and cropping the full page document image below the lower boundary to transform the full page document image to a check-specific image.

2. The method of claim 1 further comprising the step of creating a new image file of the check-specific image.

3. The method of claim 1 wherein the regressive analysis further comprises the steps of:
    identifying the upper boundary for a processed check, the upper boundary defined by a measurement selected from the group consisting of distance below the full page document image top, distance above the full page document image bottom, and distance above the magnetic ink character recognition data;
    identifying string literals spatially proximate to the upper boundary of the processed check wherein the string literals may be located above or below the upper boundary;
    saving the string literal, the upper boundary measurement and a relative position of the string literal to the upper boundary to a data store;
    establishing a confidence threshold for defining an otherwise unknown upper boundary based on detection of the string literal; and
    defining the upper boundary of subsequently processed checks having string literals matching those saved to the data store and meeting the confidence threshold.

4. The method of claim 3 wherein the confidence threshold is established based on the frequency of the string literal successfully identifying a validated check upper boundary.

5. The method of claim 1 whereby the tallest check height dimension is selected from the collection to define the upper boundary responsive to the absence of detectable horizontal raster lines.

6. A method of resolving a check image region within a document image comprising the steps of:
    processing by optical character recognition a full page document image containing rows of text;
    defining a lower boundary of the check image region by the location of the magnetic ink character recognition data;
    establishing a check top candidate area, the check top candidate area defined by a collection of string literals derived from a regressive analysis of string literals associated with a previously validated check area upper boundary;
    detecting a horizontal raster line within the check top candidate area whereby the horizontal raster line defines the top of the check;
    defining an upper boundary of the check image region by the location of the horizontal line; and
    digitally cropping the full page document image above the upper boundary and cropping the full page document image below the lower boundary to transform the full page document image to a check-specific image.

7. The method of claim 6 further comprising the step of creating a new image file of the check-specific image.

8. The method of claim 6 wherein the step of defining the upper boundary of the check image region comprises locating a horizontal raster line farthest from the lower boundary from a plurality of horizontal raster lines within the check top candidate area.

9. The method of claim 6 whereby the tallest check height dimension is selected from the collection to define the upper boundary responsive to the absence of detectable horizontal raster lines.

10. The method of claim 6 further comprising the step of creating a new image file of the check-specific image.

11. The method of claim 6 wherein the regressive analysis further comprises the steps of:
    identifying the upper boundary for a processed check, the upper boundary defined by a measurement selected from the group consisting of distance below the full page document image top, distance above the full page document image bottom, and distance above the magnetic ink character recognition data;
    identifying string literals spatially proximate to the upper boundary of the processed check wherein the string literals may be located above or below the upper boundary;
    saving the string literal, the upper boundary measurement and a relative position of the string literal to the upper boundary to a data store;
    establishing a confidence threshold for defining an otherwise unknown upper boundary based on detection of the string literal; and
    defining the upper boundary of subsequently processed checks having string literals matching those saved to the data store and meeting the confidence threshold.

12. One or more non-transitory, computer-readable media having computer-executable instructions for performing a method of running a software program on a computer, the computer operating under an operating system, the method including issuing instructions from the software program comprising:

processing by optical character recognition a full page document image containing rows of text;

defining a lower boundary of the check image region by the location of the magnetic ink character recognition data;

establishing an upper boundary of the check image region, the upper boundary defined by a collection of string literals derived from a regressive analysis of string literals spatially associated with a previously validated upper boundary; and digitally cropping the full page document image above the upper boundary and cropping the full page document image below the lower boundary to transform the full page document image to a check-specific image.

13. The one or more non-transitory, computer-readable media of claim 12 further comprising the step of creating a new image file of the check-specific image.

14. The one or more non-transitory, computer-readable media of claim 12 wherein the step of defining the upper boundary of the check image region comprises locating a horizontal raster line farthest from the lower boundary from a plurality of horizontal raster lines within a check top candidate area defined by an identified string literal.

15. The one or more non-transitory, computer-readable media of claim 12 wherein the tallest check height dimension is selected from the collection to define the upper boundary responsive to the absence of detectable horizontal raster lines or string literals.

16. The one or more non-transitory, computer-readable media of claim 12 wherein the regressive analysis comprises the steps of:

identifying the upper boundary for a processed check, the upper boundary defined by a measurement selected from the group consisting of distance below the full page document image top, distance above the full page document image bottom, and distance above the magnetic ink character recognition data;

identifying string literals spatially proximate to the upper boundary of the processed check wherein the string literals may be located above or below the upper boundary;

saving the string literal, the upper boundary measurement and a relative position of the string literal to the upper boundary to a data store;

establishing a confidence threshold for establishing an otherwise unknown upper boundary based on detection of the string literal; and establishing the upper boundary of subsequently processed checks having string literals matching those saved to the data store and meeting the confidence threshold.

17. The method of claim 16 wherein the confidence threshold is established based on the frequency of the string literal successfully identifying a validated check upper boundary.

18. The method of claim 12 whereby the tallest check height dimension is selected from the collection to define the upper boundary responsive to the absence of detectable horizontal raster lines.

* * * * *